US011287071B2

(12) United States Patent
Prince

(10) Patent No.: US 11,287,071 B2
(45) Date of Patent: Mar. 29, 2022

(54) QUICK CONNECT DEVICE FOR CONNECTING TUBULAR MEMBERS

(71) Applicant: Haier US Appliance Solutions, Inc., Wilmington, DE (US)

(72) Inventor: Ryan John Prince, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 245 days.

(21) Appl. No.: 16/276,720

(22) Filed: Feb. 15, 2019

(65) Prior Publication Data
US 2020/0263818 A1   Aug. 20, 2020

(51) Int. Cl.
*F16L 37/091* (2006.01)
*F16L 21/03* (2006.01)
*F16L 21/08* (2006.01)

(52) U.S. Cl.
CPC ........... *F16L 37/0915* (2016.05); *F16L 21/03* (2013.01); *F16L 21/08* (2013.01)

(58) Field of Classification Search
CPC ....... F16L 21/03; F16L 21/08; F16L 37/0915; F16L 37/0925; F16L 37/091; F16L 37/10
USPC .................................................. 285/39, 340
See application file for complete search history.

(56) References Cited

U.S. PATENT DOCUMENTS

| 4,810,009 | A | 3/1989 | Legris | |
|---|---|---|---|---|
| 8,608,205 | B2* | 12/2013 | Lai | F16L 37/0915 |
| | | | | 285/39 |
| 2015/0323112 | A1* | 11/2015 | Wright | F16L 21/08 |
| | | | | 285/349 |

FOREIGN PATENT DOCUMENTS

GB   2528812 B   3/2016

* cited by examiner

*Primary Examiner* — Aaron M Dunwoody
(74) *Attorney, Agent, or Firm* — Dority & Manning, P.A.

(57) ABSTRACT

A quick connection device for fluidly connecting tubular members is provided. In one example aspect, the connection device includes a housing defining a pass-through opening. Locking rings having a plurality of locking pins are disposed within the pass-through opening and are operable to engage tubular members received therein. The housing includes opposing connection ends each having threaded portions. Collets each having a sleeve can be threadingly engaged with the connection ends of the housing via the threaded portions. The collets can be threaded onto the connection ends such that their sleeves engage the locking pins of the locking rings. The engagement of the sleeves with the locking pins causes the locking pins to deflect, which allows the tubular members to be inserted/removed into or from the pass-through opening without need for a user to apply a continuous force on the locking ring and without scratching the tubular members.

19 Claims, 7 Drawing Sheets

QUICK CONNECT DEVICE FOR CONNECTING TUBULAR MEMBERS

FIELD OF THE INVENTION

The subject matter of the present disclosure relates generally to a connection device for fluidly connecting and disconnecting tubular members, such as e.g., pipes or tubing.

BACKGROUND OF THE INVENTION

Quick connects or connection devices are used in a number of industries to fluidly connect tubular members, such as e.g., pipes, tubes, etc. Making such quick connectors easy to install and uninstall from tubular members without damaging them has proved challenging. Conventional designs are often difficult to remove and require a user to apply a significant force to install/uninstall the quick connect. Many times the quick connect is located in a hard to reach area, making it harder for the user to apply a sufficient force to install/uninstall the quick connect. Furthermore, conventional designs typically include one or more locking rings operable to engage the tubular members to hold them in place. To remove such conventional quick connects, a user must apply a constant force on a collet to release the locking ring from the tubular member. Many times the locking ring is not completely disengaged from the tubular member despite the constant applied force, and as a result, the tubular member becomes scratched or scored by the locking ring as the quick connect and tubular member are moved relative to one another. Accordingly, a poor seal may result if the quick connect is reapplied to the scratched tubular member.

Accordingly, improved connection devices that address one or more of the challenges noted above would be useful.

BRIEF DESCRIPTION OF THE INVENTION

Aspects and advantages of embodiments of the present disclosure will be set forth in part in the following description, or may be learned from the description, or may be learned through practice of the embodiments.

In a first exemplary embodiment, a connection device is provided. The connection device includes a housing defining an opening having a first open end operable to receive a first tubular member. Further, the connection device includes a first engagement member coupled with the housing and disposed within the opening, the first engagement member operable to engage the first tubular member. Moreover, the connection device includes a first collet threadingly engaged with the housing and having a sleeve extending into the first open end of the opening, wherein the first collet is operable to thread onto the housing such that the sleeve engages the first engagement member to disengage the first engagement member from the first tubular member.

In a second exemplary embodiment, a connection device is provided. The connection device defines an axial direction, a radial direction, and a circumferential direction. The connection device includes a housing extending between a first connection end and a second connection end along the axial direction and defining a pass-through opening extending between a first open end and a second open end along the axial direction, the first open end operable to receive a first tubular member and the second open end operable to receive a second tubular member. Further, the connection device includes a first locking ring coupled with housing and disposed within the pass-through opening, the first locking ring having a plurality of locking pins spaced from one another along the circumferential direction and operable to engage the first tubular member. The connection device also includes a second locking ring coupled with housing and disposed within the pass-through opening, the second locking ring having a plurality of locking pins spaced from one another along the circumferential direction and operable to engage the second tubular member. In addition, the connection device includes a first collet threadingly engaged with the first connection end of the housing and having a sleeve extending into the first open end of the pass-through opening, wherein the first collet is operable to thread onto the first connection end of the housing such that the sleeve deflects the plurality of pins of the first locking ring. Moreover, the connection device includes a second collet threadingly engaged with the second connection end of the housing and having a sleeve extending into the second open end of the pass-through opening, wherein the second collet is operable to thread onto the second connection end of the housing such that the sleeve deflects the plurality of pins of the second locking ring.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
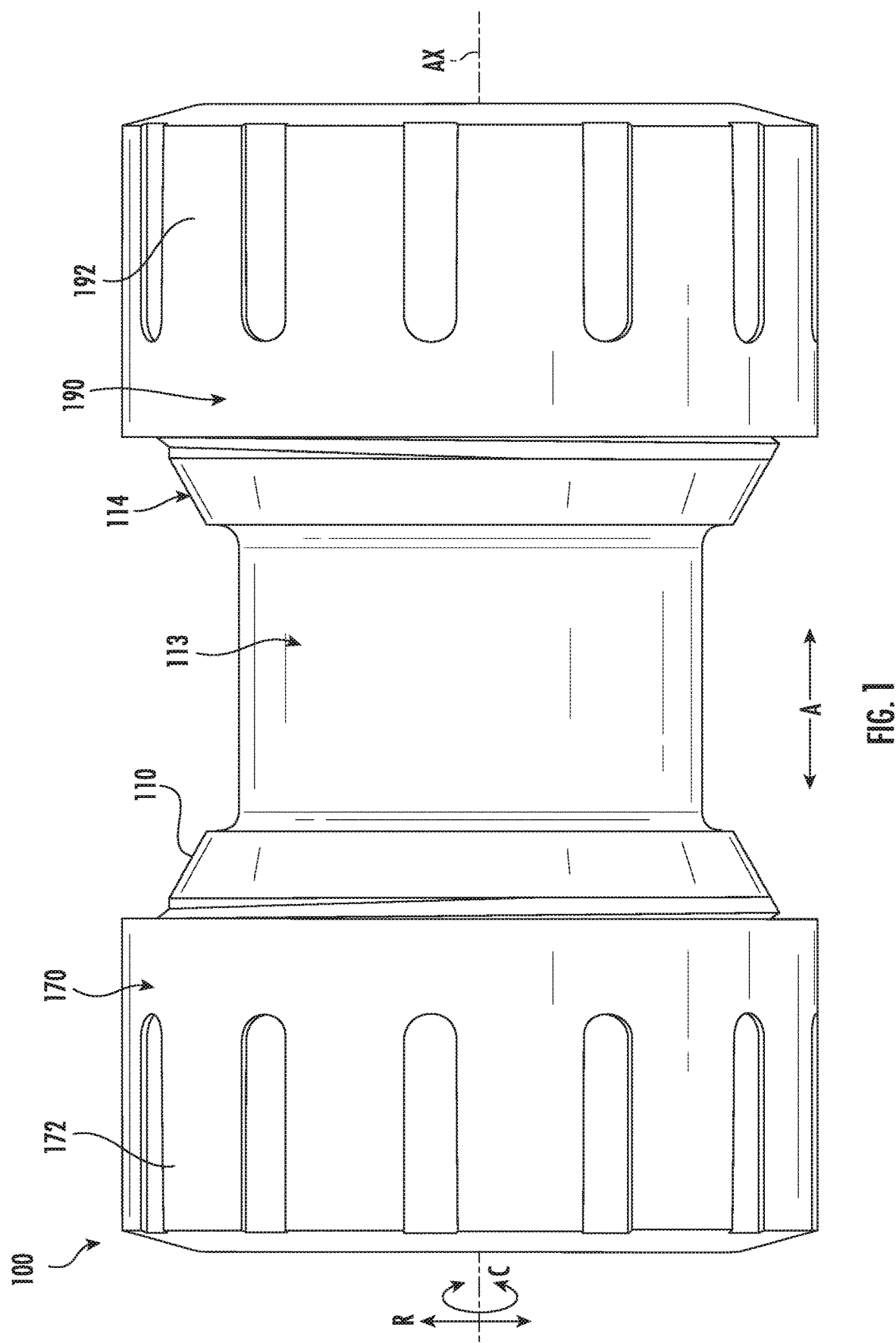
FIG. 1 provides a side view of a connection device according to an example embodiment of the present subject matter and depicts a first and second collet of the connection device threadingly engaged with a cylindrical housing of the connection device.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
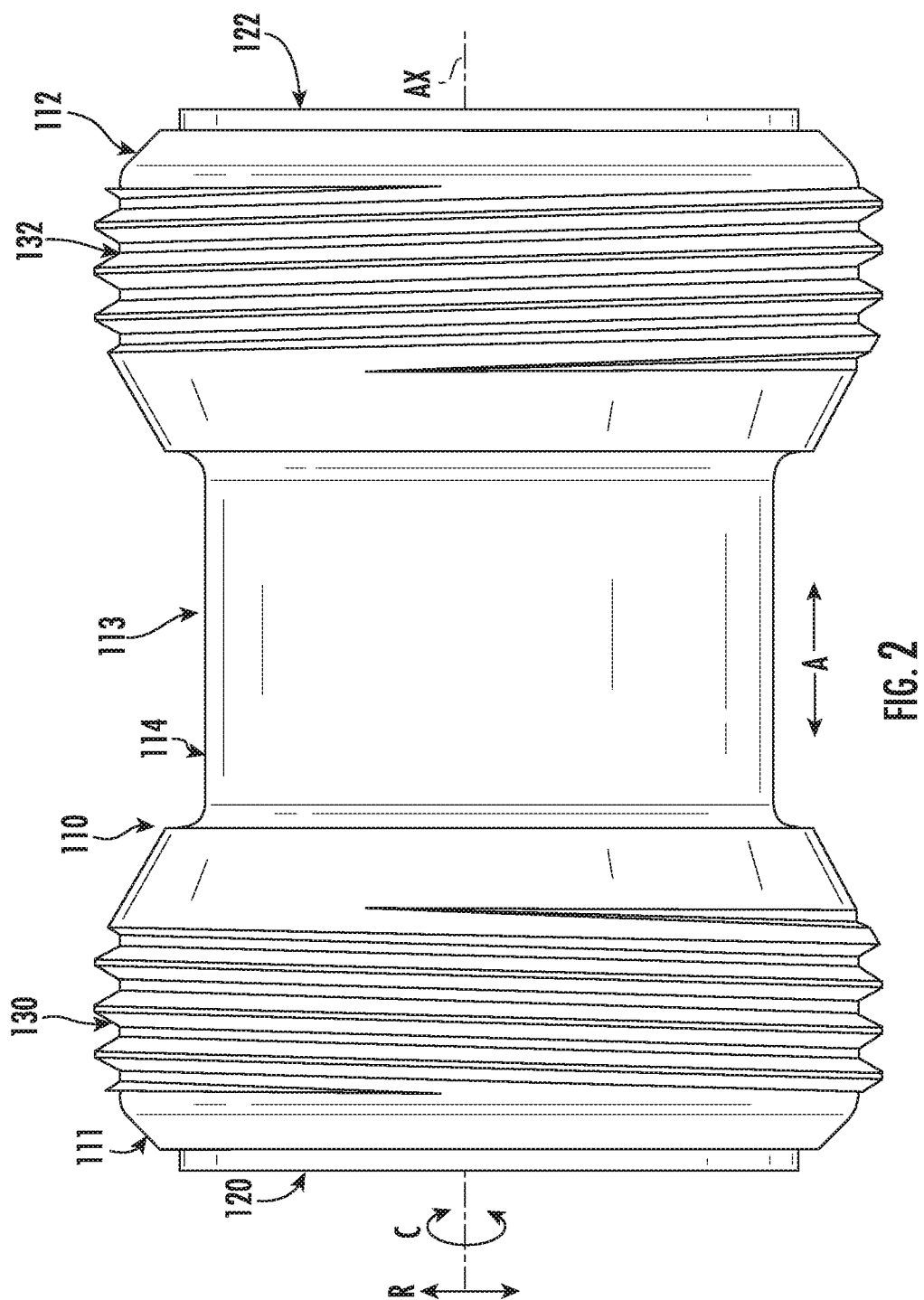
FIG. 2 provides another side view of the connection device of FIG. 1 and depicts the first and second collets removed from the cylindrical housing.
Figure 3:
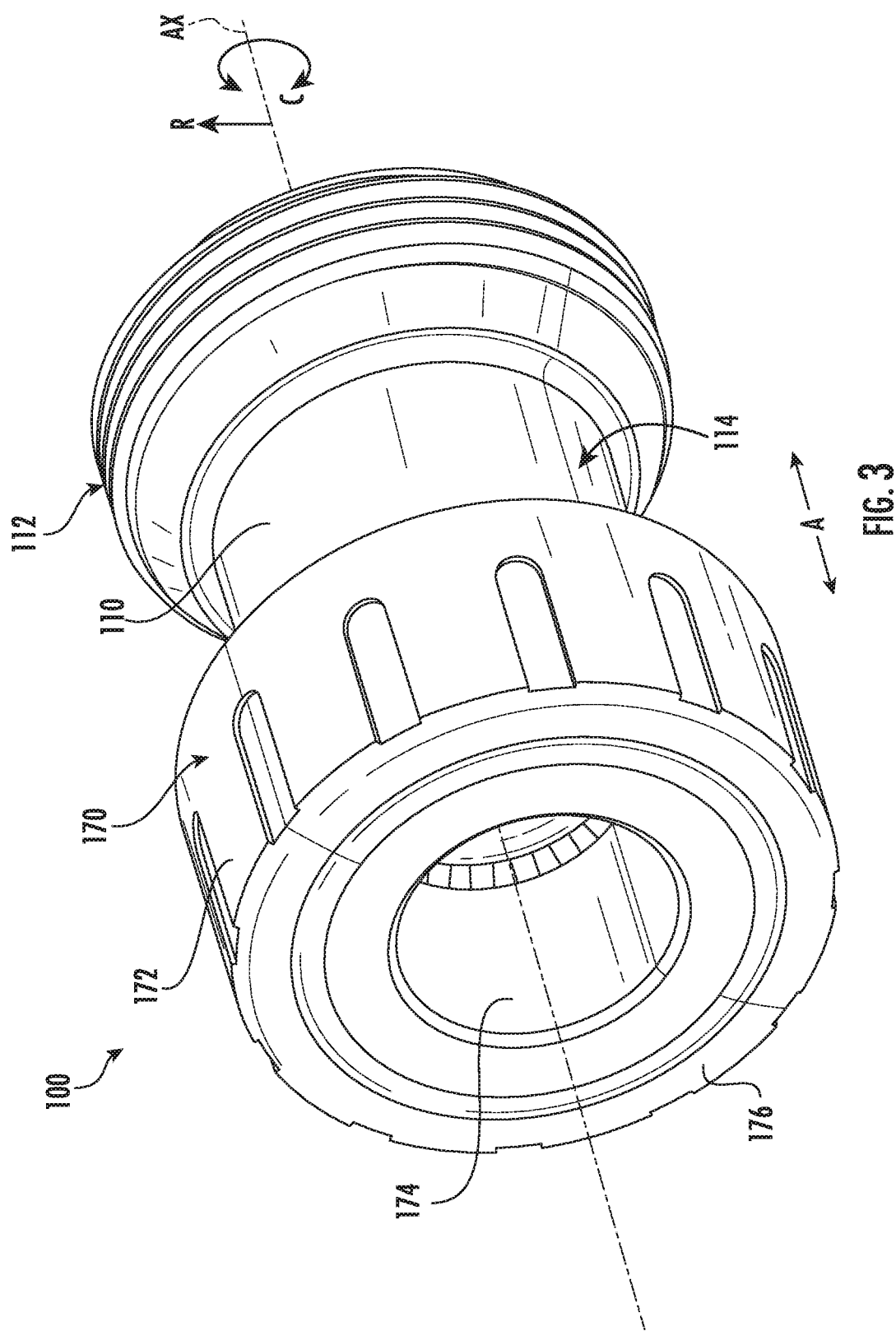
FIG. 3 provides a perspective view of the connection device of FIG. 1 with the first collet threadingly engaged with the cylindrical housing and the second collet removed therefrom.
Figure 4:
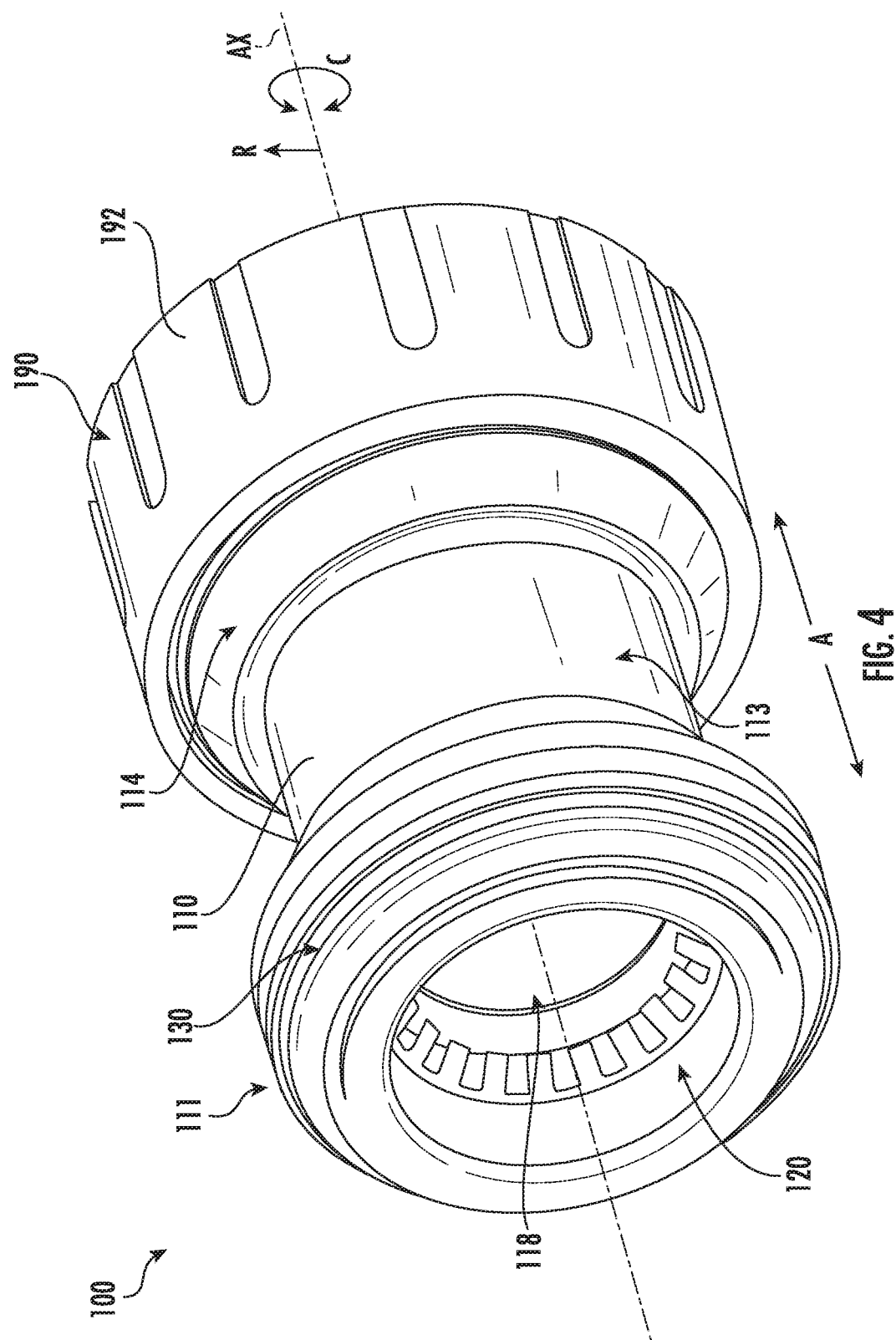
FIG. 4 provides a perspective view of the connection device of FIG. 1 with the second collet threadingly engaged with the cylindrical housing and the first collet removed therefrom.
Figure 5:
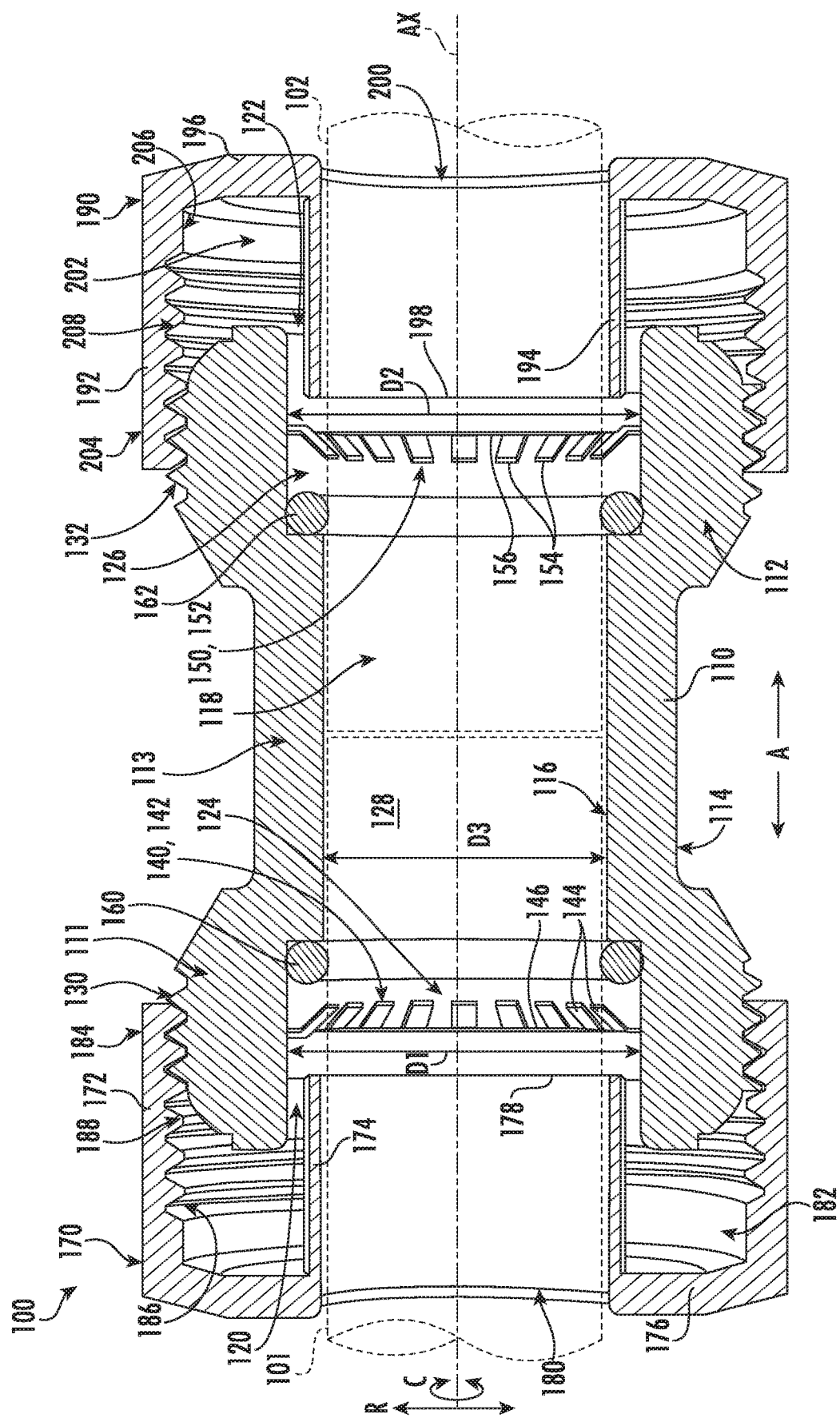
FIG. 5 provides a cross-sectional view of the connection device of FIG. 1 and depicts the connection device fluidly connecting a first tubular member and a second tubular member.

FIGS. 1 through 5 provide various views of a connection device 100 according to an example embodiment of the present subject matter. Particularly, FIG. 1 provides a side view of connection device 100 and depicts a first collet 170 and a second collet 190 of the connection device 100 threadingly engaged with a cylindrical housing 110 of the connection device 100. FIG. 2 provides another side view of the connection device 100 and depicts the first and second collets 170, 190 (FIG. 1) removed from the cylindrical housing 110. FIG. 3 provides a perspective view of the connection device 100 with the first collet 170 threadingly engaged with cylindrical housing 110 and the second collet 190 (FIG. 1) removed 190 therefrom. FIG. 4 provides a perspective view of the connection device 100 with the second collet 190 threadingly engaged with cylindrical housing 110 and first collet 170 (FIG. 1) removed therefrom. FIG. 5 provides a cross-sectional view of connection device 100 and depicts the connection device 100 fluidly connecting a first tubular member 101 and a second tubular member 102. As shown generally in FIGS. 1 through 5, for reference purposes, connection device 100 defines an axial direction A, a longitudinal or axial centerline AX extending along the axial direction A, a radial direction R extending to and from the axial centerline AX (or inward and outward, respectively), and a circumferential direction C extending three hundred sixty degrees (360°) around the axial centerline AX.

Generally, connection device 100 is operatively configured to fluidly connect tubular members, such as e.g., pipes, tubing, etc. For example, connection device 100 can be employed to quickly connect Cross-Linked Polyethylene (PEX) or copper pipes for plumbing applications. As will be explained herein, the connection device 100 of the present disclosure can be more easily slid into position and more easily removed from tubular members than conventional connection devices. Furthermore, in addition to the ease of sliding connection device 100 into and out of position relative to tubular members, the connection device 100 of the present disclosure can be slid into position or removed therefrom without scratching or scoring the tubular members. The connection device 100 can have other benefits and advantages as well.

Connection device 100 includes cylindrical housing 110. Cylindrical housing 110 has an outer surface 114 generally defining the outer diameter thereof and an inner surface 116 (FIG. 5) spaced inward of outer surface 114 along the radial direction R. Inner surface 116 generally defines the inner diameter of cylindrical housing 110. Cylindrical housing 110 extends between a first connection end 111 and a second connection end 112 along the axial direction A as best shown in FIG. 2. A center portion 113 of cylindrical housing 110 is disposed between first connection end 111 and second connection end 112 along the axial direction A. Cylindrical housing 110 defines a pass-through opening 118 (FIG. 5) that extends between a first open end 120 and an opposing second open end 122 along the axial direction A. The first open end 120 is operable to receive first tubular member 101 (FIG. 5) and the second open end 122 is operable to receive a second tubular member 102 (FIG. 5). The first and second tubular members 101, 102 can be any suitable type of tubular member, such as e.g., pipes, tubes, etc., and can be formed of any suitable material, such as e.g., metal, PEX, etc.

As depicted in FIG. 5, the pass-through opening 118 defined by cylindrical housing 110 has three (3) different stages or sections. Specifically, the pass-through opening 118 has a first section 124 having a first diameter D1, a second section 126 having a second diameter D2, and a center section 128 having a diameter D3. The center section 128 extends between and connects the first section 124 and the second section 126 along the axial direction A. For this embodiment, the first diameter D1 of the first section 124 is the same or substantially the same as the second diameter D2 of the second section 126. Moreover, the third diameter D3 of the center section 128 is a smaller than the first diameter D1 and the second diameter D2 of the first and second sections 124, 126, respectively. In alternative exemplary embodiments, the first diameter D1 of the first section 124 can be greater or less than the second diameter D2 of the second section 126. Further, as depicted in FIG. 5, when first tubular member 101 is received by first open end 120, first tubular member 101 can extend axially into pass-through opening 118 such that at least a portion of first tubular member 101 is positioned within the center section 128 of pass-through opening 118. Similarly, when second tubular member 102 is received by second open end 122, second tubular member 102 can extend axially into pass-through opening 118 such that at least a portion of second tubular member 102 is positioned within the center section 128 of pass-through opening 118.

As shown best in FIG. 5, connection device 100 includes a first engagement member 140 operable to engage first tubular member 101 and a second engagement member 150 operable to engage second tubular member 102, e.g., to secure connection device 100 in position relative to first tubular member 101 and second tubular member 102, respectively. First engagement member 140 is coupled with cylindrical housing 110 and is disposed within pass-through opening 118. More specifically, first engagement member 140 is coupled with inner surface 116 of cylindrical housing 110 and extends annularly along inner surface 116. First engagement member 140 is disposed within the first section 124 of pass-through opening 118. Second engagement member 150 is likewise coupled with cylindrical housing 110 and is disposed within pass-through opening 118. More specifically, second engagement member 150 is coupled with inner surface 116 of cylindrical housing 110 and extends annularly along inner surface 116. Second engagement member 150 is disposed within the second section 126 of pass-through opening 118.

For this embodiment, the first engagement member 140 is a first locking ring 142 having a plurality of locking pins 144. The locking pins 144 of the first engagement member 140 are spaced from one another along the circumferential direction C and are operable to engage first tubular member 101, e.g., when first tubular member 101 is received within pass-through opening 118 and connection device 100 is positioned in place relative to first tubular member 101. Each locking pin 144 has a proximal end that is connected to a ring 146 of first locking ring 142 and a free or distal end. As depicted, each locking pin 144 of first locking ring 142 extends toward the center section 128 along the axial direction A from ring 146. Moreover, each locking pin 144 extends radially inward or inward toward the axial centerline AX along the radial direction R as each locking pin 144 extends away from ring 146 along the axial direction A. Thus, the distal end of each locking pin 144 is radially inward of its proximal end. As will be explained herein, the locking pins 144 are movable between an engaged position (FIG. 5) in which the locking pins 144 are operable to engage the first tubular member 101 (e.g., when first tubular member 101 is received within pass-through opening 118) and a deflected position (FIG. 6) in which the locking pins 144 are operable to disengage from the first tubular member 101, e.g., so that connection device 100 can be slid or moved relative to first tubular member 101 or vice versa. In the disengaged or deflected position, the locking pins 144 are deflected such that the distal end of each locking pin 144 is moved radially outward or outward along the radial direction R with respect to the axial centerline AX.

In a similar manner, for this embodiment, the second engagement member 150 is a second locking ring 152 having a plurality of locking pins 154. The locking pins 154 of the second engagement member 150 are spaced from one another along the circumferential direction C and are operable to engage second tubular member 102, e.g., when second tubular member 102 is received within pass-through opening 118 and connection device 100 is positioned in place relative to second tubular member 102. Each locking pin 154 has a proximal end that is connected to a ring 156 of second locking ring 152 and a free or distal end. As depicted, each locking pin 154 of second locking ring 152 extends toward the center section 128 along the axial direction A from ring 156. Moreover, each locking pin 154 extends radially inward or inward toward the axial centerline AX along the radial direction R as each locking pin 154 extends away from ring 156 along the axial direction A. Thus, the distal end of each locking pin 154 is radially inward of its proximal end. As will be explained herein, the locking pins 154 are movable between an engaged position (FIG. 5) in which the locking pins 154 are operable to engage the second tubular member 102 (e.g., when second tubular member 102 is received within pass-through opening 118) and a deflected position (FIG. 6) in which the locking pins 154 are operable to disengage from the second tubular member 102, e.g., so that connection device 100 can be slid or moved relative to second tubular member 102 or vice versa. In the disengaged or deflected position, the locking pins 154 are deflected such that the distal end of each locking pin 154 is moved radially outward or outward along the radial direction R with respect to the axial centerline AX.

As further shown in FIG. 5, connection device 100 includes sealing elements, including a first sealing element 160 and a second sealing element 162. First and second sealing elements 160, 162 can be made of any suitable material, such as e.g., rubber or another elastomer material. First sealing element 160 is coupled with cylindrical housing 110 and is disposed within pass-through opening 118. Particularly, first sealing element 160 is coupled with inner surface 116 of cylindrical housing 110 and extends annularly along inner surface 116. First sealing element 160 is disposed within the first section 124 of pass-through opening 118 and is positioned between first engagement member 140 and the center section 128 of pass-through opening 118 along the axial direction A. First sealing element 160 is operable to sealingly engage the first tubular member 101 when the first tubular member 101 is received within pass-through opening 118. In this way, fluid (e.g., water) is prevented from flowing out of the first open end 120 of pass-through opening 118, and more specifically, fluid is prevented from exiting the center section 128 of the pass-through opening 118.

Second sealing element 162 is coupled with cylindrical housing 110 and is disposed within pass-through opening 118. Particularly, second sealing element 162 is coupled with inner surface 116 of cylindrical housing 110 and extends annularly along inner surface 116. Second sealing element 162 is disposed within the second section 126 of pass-through opening 118 and is positioned between second engagement member 150 and the center section 128 of pass-through opening 118 along the axial direction A. Second sealing element 162 is operable to sealingly engage the second tubular member 102 when the second tubular member 102 is received within pass-through opening 118. Accordingly, fluid (e.g., water) is prevented from flowing out of the second open end 122 of pass-through opening 118. First sealing element 160 and second sealing element 162 collectively prevent fluid from exiting the center section 128 of the pass-through opening 118.

Cylindrical housing 110 includes various threaded portions. Particularly, cylindrical housing 110 has a first threaded portion 130 along its outer surface 114 at first connection end 111 and a second threaded portion 132 along its outer surface 114 at second connection end 112. First threaded portion 130 is defined annularly around first connection end 111 and second threaded portion 132 is defined annularly around second connection end 112. As will be explained below, first collet 170 is operable to threadingly engage first threaded portion 130 and second collet 190 is operable to threadingly engage second threaded portion 132.

As noted above, connection device includes first collet 170. As shown best in FIG. 5, first collet 170 has an outer wall 172, a sleeve 174, and an end wall 176. Sleeve 174 extends from end wall 176 along the axial direction A and has a generally cylindrical shape. First section 124 of pass-through opening 118 is operable to receive at least a portion of sleeve 174, e.g., when first collet 170 is threadingly engaged with cylindrical housing 110. Sleeve 174 is received within first section 124 of pass-through opening 118, e.g., when first collet 170 is threadingly coupled with first connection end 111 of cylindrical housing 110. Sleeve 174 has a sleeve end 178 at the distal end of its annulus. Sleeve 174 defines a sleeve opening 180 that is operable to receive first tubular member 101 as illustrated in FIG. 5.

Outer wall 172 of first collet 170 is spaced from sleeve 174 along the radial direction R and extends around sleeve 174 along the circumferential direction C. End wall 176 extends annularly in a plane orthogonal to the axial direction A to connect outer wall 172 with sleeve 174. An annular volume 182 is defined by outer wall 172, sleeve 174, and end wall 176. Annular volume 182 is operable to receive at least a portion of first connection end 111 of cylindrical housing 110. Outer wall 172 has an outer surface 184 and an inner surface 186 spaced from outer surface 184 along the radial direction R. First collet 170 has a threaded portion 188 along the inner surface 186 of its outer wall 172. As shown in FIG. 5, threaded portion 188 of first collet 170 is operable to threadingly engage the first threaded portion 130 of cylindrical housing 110. Accordingly, the first collet 170 is threadingly engaged with cylindrical housing 110 via engagement of the threaded portion 188 of first collet 170 and the first threaded portion 130 of cylindrical housing 110. When first collet 170 is threaded "ON" first connection end 111 of cylindrical housing 110, first collet 170 moves in a direction toward the center section 128 of pass-through opening 118 (or toward the center portion 113 of cylindrical housing 110) along the axial direction A (a direction to the right in FIG. 5). In contrast, when first collet 170 is threaded "OFF" first connection end 111 of cylindrical housing 110, first collet 170 moves in a direction away from the center section 128 of pass-through opening 118 (or away from the center portion 113 of cylindrical housing 110) along the axial direction A (a direction to the left in FIG. 5).

For this embodiment, connection device also includes second collet 190. Generally, second collet 190 is configured in a similar manner as first collet 170. Particularly, as depicted in FIG. 5, second collet 190 has an outer wall 192, a sleeve 194, and an end wall 196. Sleeve 194 extends from end wall 196 along the axial direction A and has a generally cylindrical shape. Second section 126 of pass-through opening 118 is operable to receive at least a portion of sleeve 194, e.g., when second collet 190 is threadingly engaged with cylindrical housing 110. Sleeve 194 has a sleeve end 198 at the distal end of its annulus. Sleeve 194 is received within second section 126 of pass-through opening 118. Sleeve 194 defines a sleeve opening 200 that is operable to receive second tubular member 102.

Outer wall 192 of second collet 190 is spaced from sleeve 194 along the radial direction R and extends around sleeve 194 along the circumferential direction C. End wall 196 extends annularly in a plane orthogonal to the axial direction A to connect outer wall 192 with sleeve 194. An annular volume 202 is defined by outer wall 192, sleeve 194, and end wall 196. Annular volume 202 is operable to receive at least a portion of second connection end 112 of cylindrical housing 110. Outer wall 192 of second collet 190 has an outer surface 204 and an inner surface 206 spaced from outer surface 204 along the radial direction R. Second collet 190 has a threaded portion 208 along the inner surface 206 of its outer wall 192. As shown in FIG. 5, threaded portion 208 of second collet 190 is operable to threadingly engage the second threaded portion 132 of cylindrical housing 110. Accordingly, second collet 190 is threadingly engaged with cylindrical housing 110 via engagement of the threaded portion 208 of second collet 190 and the second threaded portion 132 of cylindrical housing 110. When second collet 190 is threaded "ON" second connection end 112 of cylindrical housing 110, second collet 190 moves in a direction toward the center section 128 of pass-through opening 118 (or toward the center portion 113 of cylindrical housing 110) along the axial direction A (a direction to the left in FIG. 5). In contrast, when second collet 190 is threaded "OFF" second connection end 112 of cylindrical housing 110, second collet 190 moves in a direction away from the center section 128 of pass-through opening 118 (or away from center portion 113 of cylindrical housing 110) along the axial direction A (a direction to the right in FIG. 4).

Figure 6:
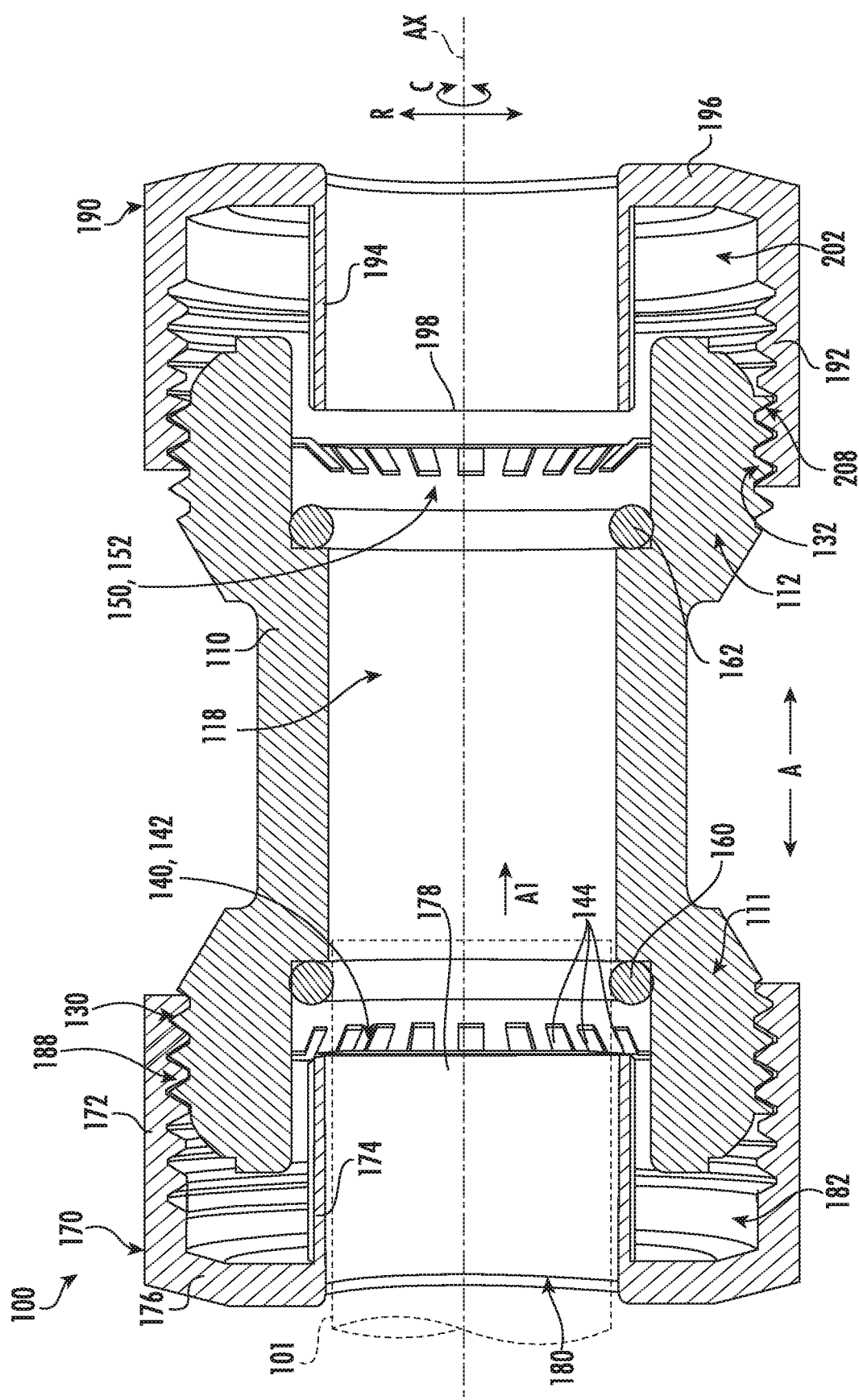
FIG. 6 provides a cross-sectional view of the connection device of FIG. 1 and depicts the first tubular member being installed with the connection device.

With reference now to FIG. 6, an example manner in which connection device 100 can fluidly connect tubular members will now be described. First tubular member 101 can be installed with connection device 100 in the following example manner. First collet 170 is first threadingly engaged with cylindrical housing 110. More particularly, the threaded portion 188 of first collet 170 is threaded into engagement with the first threaded portion 130 disposed annularly around first connection end 111 of cylindrical housing 110.

First collet 170 is threaded onto first connection end 111 of cylindrical housing 110 such that sleeve end 178 of sleeve 174 engages first engagement member 140. As shown by comparing the position of first collet 170 in FIG. 5 with the position of first collet 170 in FIG. 6, first collet 170 has been threaded onto first connection end 111 such that first collet 170 is moved to the right along the axial direction A as viewed from the perspective of FIGS. 5 and 6, denoted by the arrow labeled A1 shown in FIG. 6. As first collet 170 is threaded onto first connection end 111 and consequently moved to the right along the axial direction A, sleeve end 178 of sleeve 174 engages the locking pins 144 of locking ring 142. When sleeve end 178 engages the locking pins 144 of locking ring 142, the locking pins 144 are moved from the engaged position (FIG. 5) to the disengaged position (FIG. 6). Stated alternatively, when sleeve end 178 engages the locking pins 144, the distal end of each locking pin 144 is deflected or moved radially outward or outward along the radial direction R with respect to the axial centerline AX. Accordingly, the opening through first locking ring 142 through which first tubular member 101 can be inserted without engaging the locking pins 144 is increased.

Once sleeve 174 of first collet 170 engages the locking pins 144 of locking ring 140 as shown in FIG. 6, the locking pins 144 remain in the disengaged position until first collet 170 is threaded such that sleeve end 178 disengages from the locking pins 144. Notably, a user need not hold a tool or the collet in place to apply a continuous force to the locking pins 144 to keep them in the deflected or disengaged position while first tubular member 101 is received within pass-through opening 118; rather, the engagement of the sleeve end 178 with the locking pins 144 keeps or maintains the locking pins 144 in the disengaged position. Accordingly, first tubular member 101 can be received within pass-through opening 118 as shown in FIG. 6 without the locking pins 144 engaging the first tubular member 101 and without need for a user to apply a continuous force during the installation. Moreover, a user can use the extra hand to install first tubular member 101 with connection device 100.

Once first tubular member 101 is positioned in the proper position relative to connection device 100 (or vice versa), first collet 170 can be threaded off of first connection end 111 of cylindrical housing 110 (e.g., moved a direction to the left in FIG. 6, which is a direction opposite the arrow labeled as A1) such that sleeve end 178 of sleeve 174 disengages first locking ring 142. More specifically, first collet 170 can be threaded off of first connection end 111 of cylindrical housing 110 such that sleeve end 178 of sleeve 174 disengages from the locking pins 144 of first locking ring 142. When sleeve end 178 disengages from the locking pins 144, the locking pins 144 return to their resting state. Stated differently, the locking pins 144 moved from the disengaged position (FIG. 6) to the engaged position (FIG. 5) so that the locking pins 144 can engage first tubular member 101 to secure first tubular member 101 in position relative to connection device 100. As will be appreciated in view of the description above and the accompanying drawings, second tubular member 102 can be installed with connection device 100 in the same or similar manner as described above with respect to first tubular member 101. As a result, connection device 100 can fluidly connect first tubular member 101 and second tubular member 102 as shown in FIG. 5. In this way, fluid can flow from first tubular member 101 to second tubular member 102 or vice versa. The first and second sealing elements 160, 162 prevent fluid from escaping from the center section 128 of pass-through opening 118.

Figure 7:
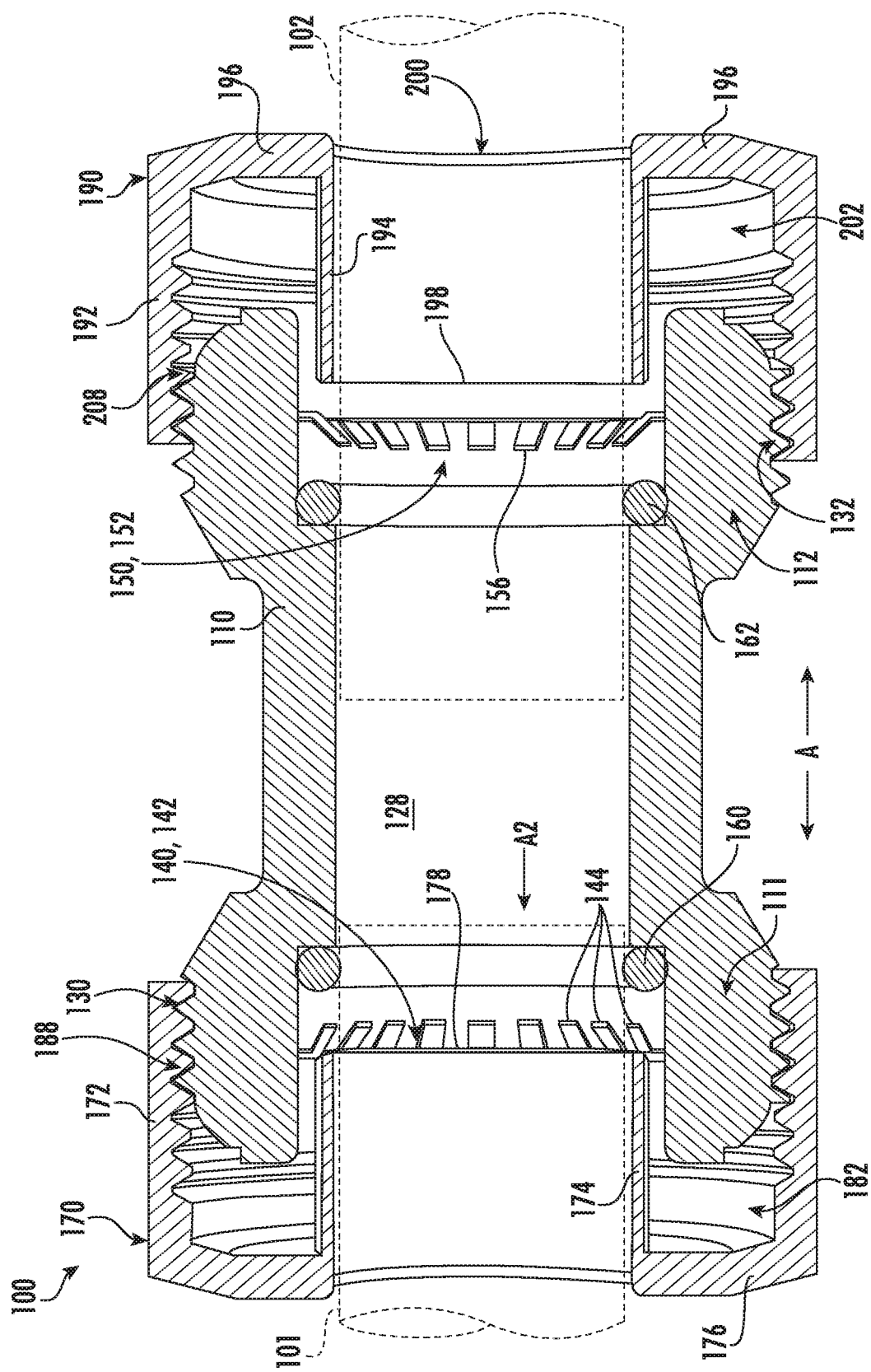
FIG. 7 provides a cross-sectional view of the connection device of FIG. 1 and depicts the first tubular member being removed from the connection device.

With reference now to FIG. 7, an example manner in which tubular members can be removed or uninstalled from connection device 100 will now be described. To uninstall first tubular member 101 from connection device 100, first collet 170 is first threaded onto first connection end 111 of cylindrical housing 110. In some instances, first collet 170 can already be threaded onto first connection end 111 of cylindrical housing 110. First collet 170 is threaded onto first connection end 111 so that sleeve 174 of first collet 170 engages first engagement member 140, which in this embodiment is first locking ring 142. More particularly, first collet 170 is threaded onto cylindrical housing 110 so that sleeve end 178 of sleeve 174 engages the locking pins 144 of first locking ring 142. When sleeve end 178 engages the locking pins 144, as noted above, the locking pins 144 are moved from the engaged position (FIG. 5) to the disengaged position (FIG. 7). Stated differently, when sleeve end 178 engages the locking pins 144, the distal end of each locking pin 144 is moved radially outward or outward along the radial direction R with respect to the axial centerline AX. Consequently, the locking pins 144 disengage from first tubular member 101.

The locking pins 144 remain in the disengaged position until first collet 170 is threaded such that sleeve end 178 disengages the locking pins 144. Notably, a user need not hold a tool or the collet in place to apply a continuous force to the locking pins 144 to keep them in the deflected or disengaged position while first tubular member 101 is removed from pass-through opening 118; rather, the engagement of the sleeve end 178 with the locking pins 144 keeps or maintains the locking pins 144 in the disengaged position. Accordingly, first tubular member 101 can be removed from pass-through opening 118 as shown in FIG. 7 without the locking pins 144 engaging the first tubular member 101 and without need for a user to apply a continuous force during the uninstall process. Moreover, a user can use the extra hand to remove first tubular member 101 from connection device 100. First tubular member 101 can be removed from pass-through opening 118 to the left along the axial direction A as viewed from the perspective of FIG. 7, denoted by the arrow labeled A2.

As will be appreciated in view of the description above and accompanying drawings, second tubular member 102 can be uninstalled or removed from connection device 100 in the same or similar manner as described above with respect to the first tubular member 101. Particularly, the locking pins 154 of second locking ring 152 can be disengaged from second tubular member 102 and second tubular member 102 can be removed from pass-through opening 118 in a direction to the right along the axial direction A as viewed from the perspective of FIG. 7, or a direction opposite the arrow labeled A2. As a result, connection device 100 can be disconnected from tubular members without applying a continuous force and without scratching or scoring the tubular members with the locking pins of the locking rings as the tubular members are removed therefrom.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A connection device, comprising:
    a housing defining an opening having a first open end operable to receive a first tubular member;
    a first engagement member coupled with the housing and disposed within the opening, the first engagement member operable to engage the first tubular member; and
    a first collet having an outer wall threadingly engaged with the housing, an end wall connected to the outer wall, and a sleeve connected to and extending from the end wall, the outer wall, the end wall, and the sleeve are formed as a unitary, one-piece structure, the sleeve extending into the first open end of the opening and directly engaging the first engagement member to disengage the first engagement member from the first tubular member, and wherein the sleeve engages only the first engagement member without contacting the housing or any other structure in contact with the housing.

2. The connection device of claim 1, wherein the first engagement member is a locking ring having a plurality of locking pins, wherein the locking pins are movable between an engaged position in which the locking pins engage the first tubular member and a deflected position in which the locking pins are disengaged from the first tubular member.

3. The connection device of claim 2, wherein the locking pins are moved to the deflected position when the first collet is threaded onto the housing such that the sleeve engages the locking pins of the first locking ring.

4. The connection device of claim 1, further comprising:
    a first sealing element coupled with the housing and disposed within the opening, the first sealing element operable to sealingly engage the first tubular member when the first tubular member is received within the opening.

5. The connection device of claim 1, wherein the housing has an outer surface and an inner surface defining the opening, and wherein the housing has a threaded portion along the outer surface.

6. The connection device of claim 5, wherein the outer wall is spaced from the sleeve along the radial direction and extends around the sleeve along the circumferential direction, the outer wall having an outer surface and an inner surface spaced from the outer surface along the radial direction, and wherein of the outer wall of the first collet has a threaded portion along the inner surface, wherein the first collet is threadingly engaged with the housing via engagement of the threaded portion of the first collet and the threaded portion of the housing.

7. The connection device of claim 1, wherein the first collet is operable to be threaded such that the sleeve disengages from the first engagement member.

8. The connection device of claim 1, wherein the first collet is operable to be threaded such that the sleeve no longer contacts the first engagement member.

9. A connection device defining an axial direction, a radial direction, and a circumferential direction, the connection device comprising:

a housing extending between a first connection end and a second connection end along the axial direction and defining a pass-through opening extending between a first open end and a second open end along the axial direction, the first open end operable to receive a first tubular member and the second open end operable to receive a second tubular member;

a first locking ring coupled with housing and disposed within the pass-through opening, the first locking ring having a plurality of locking pins spaced from one another along the circumferential direction and operable to engage the first tubular member;

a second locking ring coupled with housing and disposed within the pass-through opening, the second locking ring having a plurality of locking pins spaced from one another along the circumferential direction and operable to engage the second tubular member;

a first collet having an outer wall threadingly engaged with the first connection end of the housing, an end wall connected to the outer wall, and a sleeve connected to and extending from the end wall, the outer wall, the end wall, and the sleeve are formed as a unitary, one-piece structure, the sleeve extending into the first open end of the pass-through opening, the sleeve of the first collet directly engaging the plurality of pins to deflect the plurality of pins of the first locking ring, and wherein the sleeve of the first collet engages only the first locking ring without contacting the housing or any other structure in contact with the housing; and a second collet having an outer wall threadingly engaged with the second connection end of the housing, an end wall connected to the outer wall of the second collet, and a sleeve connected to and extending from the end wall of the second collet, the outer wall, the end wall, and the sleeve of the second collet are formed as a unitary, one-piece structure, the sleeve of the second collet extending into the second open end of the pass-through opening, the sleeve of the second collet directly engaging the plurality of pins of the second locking ring to deflect the plurality of pins of the second locking ring, and wherein the sleeve of the second collet engages only the second locking ring without contacting the housing or any other structure in contact with the housing.

10. The connection device of claim 9, wherein the outer wall, the end wall, and the sleeve of the first collet define an annular volume operable to receive at least a portion of the first connection end of the housing when the first collet is threadingly engaged with the first connection end of the housing.

11. The connection device of claim 10, wherein the outer wall of the first collet has an outer surface and an inner surface spaced from the outer surface along the radial direction, wherein the outer wall of the first collet has a threaded portion along the inner surface, and wherein the first collet is threadingly engaged with the housing via engagement of the threaded portion of the first collet and the threaded portion of the housing.

12. The connection device of claim 9, wherein the pass-through opening defined by the housing has a first section having a first diameter, a second section having a second diameter, and a center section having a third diameter and connecting and positioned between the first section and the second section along the axial direction, and wherein the third diameter of the center section is smaller than the first diameter of the first section and the second diameter of the second section.

13. The connection device of claim 12, wherein the first locking ring is disposed within the first section of the pass-through opening and the second locking ring is disposed within the second section of the pass-through opening.

14. The connection device of claim 13, further comprising:

a first sealing element disposed within the first section of the pass-through opening and positioned between the first locking member and the center section of the pass-through opening along the axial direction; and a second sealing element disposed within the second section of the pass-through opening and positioned between the second locking member and the center section of the pass-through opening along the axial direction.

15. The connection device of claim 9, wherein the outer wall is spaced from the sleeve of the first collet along the radial direction, and wherein the sleeve of the first collet extends from the end wall along the axial direction and has an annular sleeve end.

16. The connection device of claim 15, wherein when the first collet is threaded onto the first connection end of the housing, the sleeve end of the sleeve engages and deflects the plurality of locking pins of the first locking ring.

17. The connection device of claim 9, wherein the first locking ring has a ring coupling the first locking ring with the housing, and wherein each locking pin has a proximal end connecting the locking pin to the ring and a free distal end, and wherein the plurality of locking pins of the first locking ring extend from the ring along the axial direction and such that, for each locking pin of the first locking ring, the free distal end is inward of the proximal end along the radial direction.

18. The connection device of claim 9, wherein the sleeve of the first collet defines a sleeve opening operable to receive the first tubular member and the sleeve of the second collet defines a sleeve opening operable to receive the second tubular member.

19. The connection device of claim 9, wherein the first collet is operable to be threaded such that the sleeve of the first collet disengages from the plurality of pins of the first locking ring and wherein the second collet is operable to be threaded such that the sleeve of the second collet disengages from the plurality of pins of the second locking ring.

* * * * *